(12) United States Patent
Dupuis

(10) Patent No.: US 7,314,002 B2
(45) Date of Patent: Jan. 1, 2008

(54) DENSIFICATION SYSTEM

(76) Inventor: Mark A. Dupuis, 120 Woodcliff Dr., Westfield, MA (US) 01085

( * ) Notice: Subject to any disclaimer, the term of this patent is extended or adjusted under 35 U.S.C. 154(b) by 0 days.

(21) Appl. No.: 11/462,744

(22) Filed: Aug. 7, 2006

(65) Prior Publication Data
US 2007/0028510 A1 Feb. 8, 2007

Related U.S. Application Data

(60) Provisional application No. 60/595,795, filed on Aug. 5, 2005.

(51) Int. Cl.
B30B 13/00 (2006.01)
B30B 11/00 (2006.01)
B02C 23/08 (2006.01)
C10L 5/06 (2006.01)

(52) U.S. Cl. .......... 100/39; 100/94; 100/102; 100/903; 241/24.12; 241/79; 44/595; 44/596

(58) Field of Classification Search .......... 100/94, 100/97, 903, 906, 39, 102; 241/24.1, 24.12, 241/24.13, 79; 44/595, 596; 209/930
See application file for complete search history.

(56) References Cited

U.S. PATENT DOCUMENTS

| | | |
|---|---|---|
| 3,910,775 A | 10/1975 | Jackman |
| 4,561,860 A | 12/1985 | Gulley et al. |
| 4,692,167 A * | 9/1987 | Levasseur .................. 44/629 |
| 4,702,746 A | 10/1987 | Finch |
| 4,859,211 A | 8/1989 | Moore |
| 5,009,672 A | 4/1991 | Ruffo et al. |
| 5,342,418 A | 8/1994 | Jesse |
| 5,387,267 A | 2/1995 | Warf et al. |
| 5,643,342 A | 7/1997 | Andrews |
| 5,980,595 A | 11/1999 | Andrews |
| 6,136,590 A | 10/2000 | Kruse |
| 6,152,974 A | 11/2000 | Delpiano et al. |
| 6,692,544 B1 | 2/2004 | Grillenzoni |
| 2002/0184816 A1 | 12/2002 | Philipson |
| 2004/0200138 A1 | 10/2004 | Parish |

FOREIGN PATENT DOCUMENTS
GB 2076013 11/1981

* cited by examiner

*Primary Examiner*—Jimmy T. Nguyen
(74) *Attorney, Agent, or Firm*—Deborah A. Basile; Kann K. Chadwell

(57) ABSTRACT

A densification system for shredding and densifying specification raw materials for use as an alternative fuel source. The densified specification raw materials formed by the inventive system are readily transportable to a fuel processing site where they may be used to generate energy.

12 Claims, 1 Drawing Sheet

DENSIFICATION SYSTEM

CROSS REFERENCE TO RELATED APPLICATIONS

This application claims the benefit of U.S. Provisional Application No. 60/595,795 filed on Aug. 5, 2005.

BACKGROUND OF THE INVENTION

1. Field of the Invention

The present invention relates generally to a system for shredding and densifying specification raw materials. More particularly, the invention relates to a system for shredding specification raw materials and densifying the resulting shredded specification raw materials into a compact transportable form for use as a fuel source, wherein the system comprises a unique combination of elements.

2. Background of the Invention

Many power plants in the United States use pulverized coal fired boilers. These types of boilers combust coal in suspension after the coal is pulverized into a fine powder consistency. Although the method of suspending the coal is an efficient way of burning the fuel source, the problem with this method of fuel generation, however, is that, because it utilizes coal, it is financially expensive, it depletes the environment of natural resources, and it results in polluting residues. There are other methods of combusting solid fuel in process boilers, combustion chambers and power plants that have other similar issues, problems, and inefficiencies.

Alternatively, paper derived fuel is currently used in many parts of the world. This is generally accomplished by combusting fuel in the bottom on a grate of a Stoker boiler. The problem with this practice, however, is that burning fuels, including paper derived fuel, on the bottom of the Stoker boiler may result in poor quality emissions to the environment and the stoker fired units are less efficient than other means of generating energy. Accordingly, such practices have become disfavored in the United States, and, therefore, there are few stoker units available for use as pile burning of alternative fuels, such as paper derived fuel.

Accordingly, because suspension is an efficient way of generating fuel, what is needed is a system that can suspend a fuel source, and which can maintain the fuel source in suspension upon combustion, wherein the fuel source is environmentally friendly.

A key step in suspending a fuel source lies in first generating a fuel source having a size sufficient to keep it in suspension. Where the fuel source comprises paper as a base fuel, for example, the paper may be shredded into pieces to obtain a size capable of suspension. However, power plant facilities do not have the means to shred the paper based fuel and to store the shredded paper on site. Additionally, it is difficult to transport the shredded paper to the power plant facilities due to the inherent characteristics of the shredded paper and its density in shredded form. Accordingly, what is needed is a system that can densify shredded pieces of fuel source into a compact form such that the densified fuel source can be readily transported and/or stored on-site at the power plant facility.

SUMMARY OF THE INVENTION

The above deficiencies of the prior art or overcome or alleviated by a densification system for shredding specification raw materials into a suspendable form when blown or otherwise placed into a boiler or other fuel generating member, and for densifying the shredded specification raw materials into a compact form whereby the resulting densified specification raw materials can be readily transported to a fuel processing site.

DETAILED DESCRIPTION OF THE INVENTION

Figure 1:
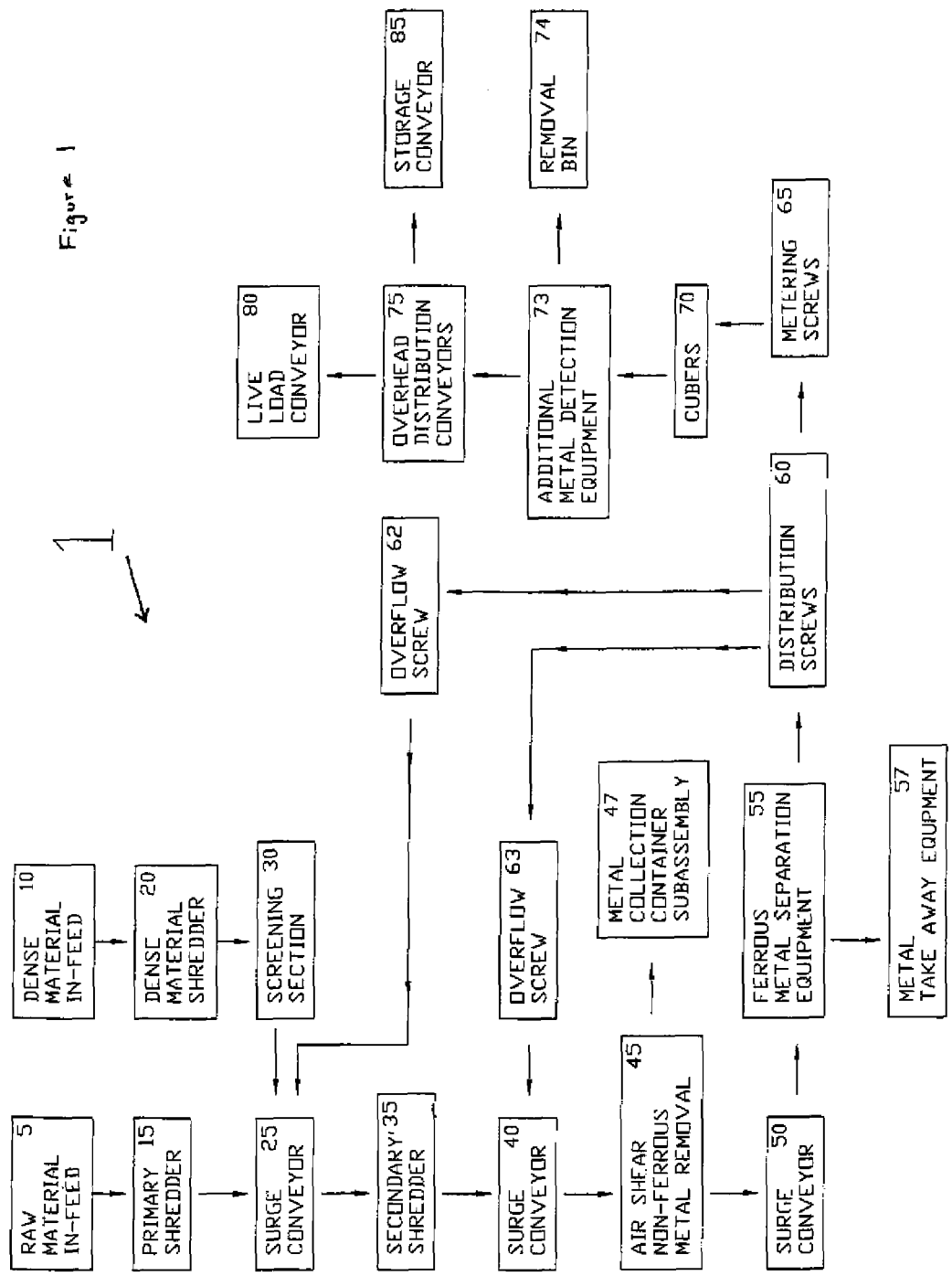
FIG. 1 is a flowchart depicting an exemplary densification system.

In general, disclosed herein is a densification system for shredding and densifying specification raw materials ("SRMs") for use as an alternative fuel ("AF") source. SRMs are defined as any inorganic or organic materials comprised of virgin, pre-consumer, post-consumer, screened, classified and unclassified material extracted from municipal solid waste (MSW) streams, and material from MSW and non-MSW streams, scrap material and by-products from manufacturing processes. Specific examples of SRMs include, but are not limited to, at least one of grass-like materials, switch grasses, vegetation, leaves, yard debris material, farming by-products, agricultural crops or low or negative cost industrial residues, classified materials from MSW plants, wood, tree bark, pallets, paper, coated paper, laminated and waxed paper, fiber, textiles, fabrics, cardboard, chip board, short fiber, plastics, films, polymers, milk containers, oil bottles, coatings, wax, fossil fuels, tar, oil, grease, animal derived fats, oils, or grease, any and all combustible materials suitable for providing fuel for combustion for creation of steam, electric power, process heat, kilns, or other conversion processes that could use the fuel as an energy source. Additionally, the SRMs may be provided from a variety of commercial, industrial, or consumer sources. The SRMs may have been used originally for any number of purposes, and may comprise a wide variety of structural and compositional forms such as rolls, bales, loose and bundled.

SRMs serve as an ideal clean combusting fuel source as it is made up of mainly carbon, hydrogen, and oxygen, and it reduces the amount of waste disposed of in landfills. Additionally, the use of SRMs as an AF source reduces toxic emissions and conserves fossil fuel resources.

The densification system of the present invention comprises a fully automated operations system, SRM feed equipment which send the SRMS to a plurality of shredders for standard sized SRMs, wherein the standard sized SRMs are shred into desired strips and/or other shapes; SRM feed equipment and shredding equipment and screen sizing sections for high density SRMs, which are to be chipped and cut into a desired SRM particle size; uniquely designed enclosed conveyance systems for fire and dust control during the shredding of the SRMs; metal separation equipment; a plurality of pelletizers or cubers for compressing a plurality of strips and shapes into a densified SRM form; transport container bays and equipment for live loading of the densified SRM forms and a holding area for storing of the densified SRM forms.

Once the densified SRM forms are made, they can be indefinitely stored on-site, and easily transported to a power plant, for example, where the densified SRM forms can than be dedensified, chopped into sufficiently sized pieces such that the individual pieces of SRMs are suspendable when placed into a burner or combustion chamber or other energy or fuel delivery generating members. Via the densification system of the present invention, then, the SRMs are shredded, blended, and compressed into a densified form to manufacture a uniform fuel from heterogeneous materials, which are easily stored and conveyed to a fuel processing facility (also referred to as power plant).

The densification system is more particularly described with reference to FIG. 1. Referring to FIG. 1, a densification system 1 comprises a raw material in-feed 5, a primary shredder 15, a dense material in-feed 10, a dense SRM material shredder 20, a screening section 30, a surge conveyor 25, a secondary shredder for final SRM sizing 35, a surge conveyor 40, an air shear for non-ferrous metals 45, a metal removal conveyor and bins, referred to as a metal collection container subassembly 47, a surge conveyor 50, ferrous metal separation equipment 55, metal take away equipment 57, a distribution screw 60, overflow screws 62 and 63, a metering screw 65, cubers 70, metal detection equipment 73, removal bin 74, overhead distribution 75, a live load cube conveyor 80, and a storage conveyor 85.

In application, the SRMs are fed through raw material in-feed 5 to primary shredder 15 where it is shredded into strips and many other desired shapes having dimensions from less than about 1 inch to as large as about 12 inches in diameter. Shredded SRMs having the proper size and densities, are then sent to surge conveyor 25. Denser SRMS, like large pieces of plastic and high tensile strength materials, such as, for example Tyvek®, cloth, and the like, are fed through dense material in-feed 10 to shredder 20, then to screening section 30, and to surge conveyor 25. The shredded SRMs in surge conveyor 25 then feed into secondary shredder 35 which further shreds the SRMs to meet the desired size range of the shredded SRMs. The now multiple-times shredded SRMs are then fed to surge conveyor 40.

The acceptable sized SRMs are then conveyed from surge conveyor 40 into the air shear 45 for non ferrous metal removal. The non-ferrous metal containing SRMs are dropped into metal collection container subassembly 47 and removed. The air shear consists of high volumes of moving air that blows the SRMs forward and allows the heavier metal materials to drop down into a separation bin for metal recovery and recycling. After non-ferrous metal removal, the remaining SRMs are dropped into surge conveyor 50. The SRMs are then transported to ferrous metal separation equipment 55 where shredded SRMs comprising ferrous metallic materials are processed to remove ferrous metals. The ferrous metals are removed by dropping the ferrous metal containing SRMS into metal take away equipment 57. The ferrous metals are removed using standard magnetic drum separators. The non-metal containing SRM are transported to distribution screw 60 for transport to metering screw 65 that feeds cubers 70. The overflow from the SRMs, i.e., those SRMs that cannot fit into cubers 70 due to cubers 70's size restraints as cubers 70 are being continuously fed, are transported by overflow screws 62 and 63, which send the unused SRMs back to surge conveyors 25 and 40.

If the shredded SRMs have the proper size and composition, they are fed to cubers 70 where the shredded SRMs are blended with water or other agents. The mixture is then compressed, pelletized or densified into cubed structures, preferably having sizes of approximately 1 inch×1 inch square and ½ inch to 6 inches long Although the shredded SRMs are described as being cubed, the SRMs may be converted into any densified form having a wide range of geometrical configurations, wherein the only limitations are based on the size of the densified SRM forms, wherein the size is based on considerations as to storage and as to dedensification of the densified SRM forms.

In an exemplary embodiment, one or more agents may be applied to the SRMs to assist in pollution control and/or to increase combustion properties. Accordingly, prior to cubing or pelletizing the stripped and shredded SRMs, the stripped SRMs may be treated or conditioned with agents, such as, but not limited to, at least one of lime, urea, vermiculite, and the like. Such conditioning further prevents the ash, which results from the eventual combustion of the SRMs from sticking to the bottom of the burner or other combustion chamber or fuel generating member and also may be used to control undesirable emissions created during combustion of the cubes or other fuels being combusted.

Once the shredded SRM materials are densified in the cubers, the densified SRM forms are conveyed and pass through additional metal separation equipment to identify metal contaminated cubes 73, if any densified SRM forms are detected comprising metal they are placed into removal bin 74 and removed. The densified SRM forms are then conveyed by overhead distribution conveyors 75 to storage conveyor 85—which indefinitely stores the densified SRM forms—or to live load conveyor 80, where the densified SRM forms may be loaded onto a transporter, such as a truck or transport vehicle. Storage conveyor 85 is used for creating inventory, quick loading on trucks, rail or barge or isolation for cubes that may have special characteristics for a specific customer. The densified SRM forms can be easily transported to a fuel processing facility with combustion chambers where they may be de-densified and then combusted to generate energy.

The densification system of the present invention is a compact easily installed modular concept that can produce approximately up to 60 tons per hour of a densified fuel source. It is contemplated that in an exemplary embodiment, the floor area needed for all of the equipment forming the system is approximately 10,000 square feet. The system is preferably designed to be a closed system under negative pressure through the use of specially designed conveyance systems that allow for dust control and fire containment. Furthermore, preferably all of the members of the system are made of metal, and contain internal fire suppressant systems therefore, fire presents little threat. Additionally, preferably the entirety of the densification of the shredded SRMs is preferably controlled by a programmable logic controller and can be operated by a single person. The system is self-monitoring and fully automated, wherein the operations are controlled to a level where the person loading the unit is the only operator required. The densified SRMs generated from the system are self-regulated and can be automatically loaded onto trailers or in a storage bin with no supervision required. The air classifier which removes heavy material through the use of high volumes of moving air across a plain where the heavy materials will drop through an opening where they fall into an external container for disposal or recycling. The air classifier is designed into the conveyance system and will separate heavy ferrous and non-materials from the material flow towards the cubers. The members forming the system and their operations are designed to be portable using standard trucking, for example, and easily reproduced and installed.

The densification system described is further unique due to its minimal need for maintenance and simple access and component replacement design. The design also allows for maintenance to be preformed on any of the cubers while the rest of the densification system is in full operation. The densification system also incorporates shredders that are not normally used in a production processing line application as described. Furthermore, the surge conveyors used to transport the shredded SRMs from the shredders to the cubers are unique to any conveyance equipment that is known to exist. Furthermore, it is contemplated that the entire densification system further comprises transparent enclosures so that all aspects of the shredding and densification process may be monitored. It is further contemplated that the system of the present invention may be operated and monitored from remote locations both on site and off site.

The foregoing description of the invention is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A densification system comprising:
    a plurality of shredders, wherein the shredders shred specification raw materials into a desired size range and density;
    an air shear non-ferrous metal remover for separating out specification raw materials containing non-ferrous metals and for removing the shredded specification raw materials containing non-ferrous metals;
    a ferrous metal remover for separating out specification raw materials containing ferrous metals and for removing the shredded specification raw materials containing ferrous metals; and
    a cuber for densifying the shredded specification raw materials into a desired densified form having desired dimensions.

2. The densification system of claim 1, further comprising:
    a plurality of overflow screws;
    a plurality of surge conveyors; and
    a distribution screw, wherein the distribution screw transmits those shredded specification raw materials that cannot fit into the cuber as the cuber is continuously fed the shredded specification raw materials to the plurality of overflow screws, and wherein the overflow screws feeds this overflow of shredded specification raw materials to the plurality of surge conveyors, wherein at least one of the surge conveyors feeds the shredded specification raw materials to one of the shredders forming the plurality of shredders.

3. The densification system of claim 2, wherein at least one of the surge conveyors feeds the shredded specification raw materials to the air shear non-ferrous metal remover.

4. A method for preparing densified specification raw materials by a densification system, the method comprising:
    shredding a first group of specification raw materials having a first range of sizes and densities via a first shredder;
    shredding a second group of specification raw materials having a second range of sizes and densities via a second shredder;
    combining the shredded specification raw materials from the first group and second group of specification raw materials to form a third group of shredded specification raw materials;
    further shredding the third group of shredded specification raw materials to form a fourth group;
    removing those shredded specification raw materials from the fourth group that contains non-ferrous metals;
    removing those shredded specification raw materials from the fourth group that contains ferrous metals; and
    densifying the fourth group of shredded specification raw materials by passing the third group of shredded specification raw materials through a cuber, wherein the cuber results in a plurality of densified specification raw material forms.

5. The method of claim 4, further comprising treating the fourth group of shredded specification raw materials with at least one of lime, urea, and vermiculite.

6. The method of claim 4, further comprising conveying an overflow of shredded specification raw materials to at least one of the shredders, wherein the overflow comprises those shredded specification raw materials from the fourth group that do not fit into the cuber.

7. The method of claim 6, wherein removing those shredded specification raw materials from the fourth group that contains non-ferrous metals comprises passing a volume of moving air through the shredded specification raw materials, such that the heavier specification raw materials to drop down into a separation bin and are removed, and such that the remaining shredded specification raw materials continue through the densification system.

8. The method of claim 7, wherein removing those shredded specification raw materials from the fourth group that contains ferrous metals comprises passing the shredded specification raw materials through magnetic drum separators.

9. The method of claim 8, further comprising treating the fourth group of shredded specification raw materials with at least one of lime, urea, and vermiculite.

10. The method of claim 9, further comprising conveying the plurality of densified specification raw material forms to at least one of a storage conveyor and a live load conveyor.

11. The method of claim 10, wherein the live load conveyor comprises a transporter.

12. A method for preparing densified specification raw materials using a densification system the method comprising:
    in-taking a first group of specification raw materials having a first range of densities;
    shredding the first group of specification raw materials to a desired size range to form a first group of shredded specification raw materials;
    in-taking a second group of specification raw materials having a second range of densities;
    shredding the second group of specification raw materials to a desired size range to form a second group of shredded specification raw materials;
    transporting the first and second groups of shredded specification raw materials to a secondary shredder, wherein the first and second groups of shredded specification raw materials are further shredded to form a third group of shredded specification raw materials;
    removing non-ferrous metal-containing shredded specification raw materials from the third group of shredded specification raw materials;
    removing ferrous metal-containing shredded specification raw materials from the third group of shredded specification raw materials;
    treating the third group of shredded specification raw materials with at least one of lime, urea, and vermiculite;
    transporting the third group of shredded specification raw materials to a cuber, wherein the cuber densifies the shredded specification raw materials into a plurality of densified forms;
    recycling any excess specification raw materials that cannot fit into the cuber back through the densification system;
    collecting the plurality of densified forms into at least one of a live load conveyance or a storage conveyance.

* * * * *